United States Patent [19]
Becker et al.

[11] 4,409,663
[45] Oct. 11, 1983

[54] DIGITAL ODOMETER

[75] Inventors: James Becker, Ann Arbor; Daniel L. Neill, Belleville, both of Mich.

[73] Assignee: Kelsey-Hayes Company, Romulus, Mich.

[21] Appl. No.: 219,199

[22] Filed: Dec. 22, 1980

[51] Int. Cl.³ .............................................. G06F 15/20
[52] U.S. Cl. .................. 364/561; 235/95 R; 364/424; 377/24
[58] Field of Search ................ 364/424, 561; 235/92 DN, 92 EA, 95 R; 340/347 P; 377/19, 24

[56] References Cited
U.S. PATENT DOCUMENTS

| | | | |
|---|---|---|---|
| 3,284,793 | 11/1966 | Smith | 340/347 P |
| 3,846,788 | 11/1974 | Calabro et al. | 340/347 P |
| 4,031,363 | 6/1977 | Freeman et al. | 235/92 DN |
| 4,139,889 | 2/1979 | Ingels | 340/347 P |
| 4,183,014 | 1/1980 | McClean et al. | 340/347 P |
| 4,250,402 | 2/1981 | Mizote et al. | 235/92 DN |
| 4,263,657 | 4/1981 | Oka et al. | 364/561 |

*Primary Examiner*—Errol A. Krass
*Attorney, Agent, or Firm*—Ralph J. Skinkiss; Oliver E. Todd; Mark Sobanski

[57] ABSTRACT

A digital odometer having a mechanical memory in the form of an encoder supplies binary data to a logic control and memory which may be a microprocessor. Both total distance and trip distance are stored in memories in the logic control and memory and are supplied to digital displays.

4 Claims, 5 Drawing Figures

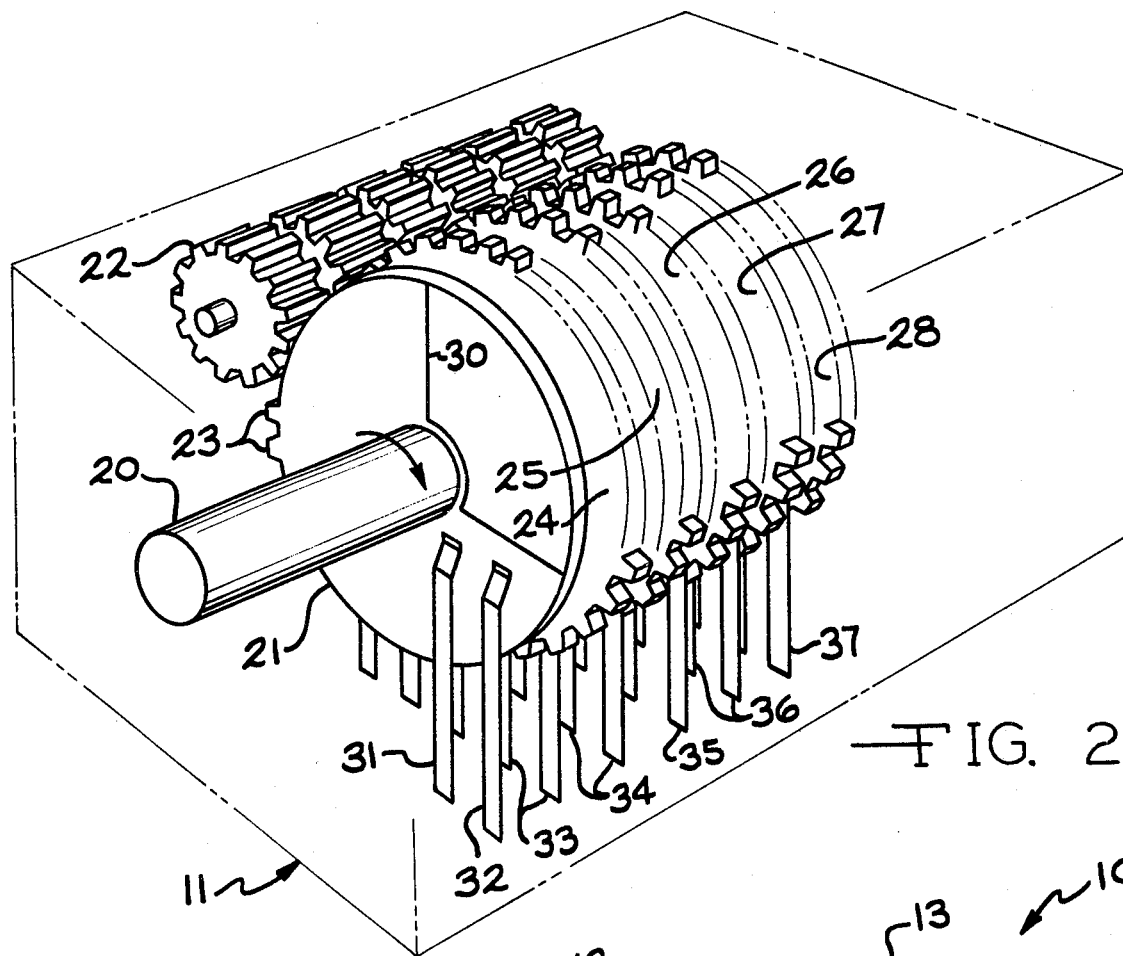
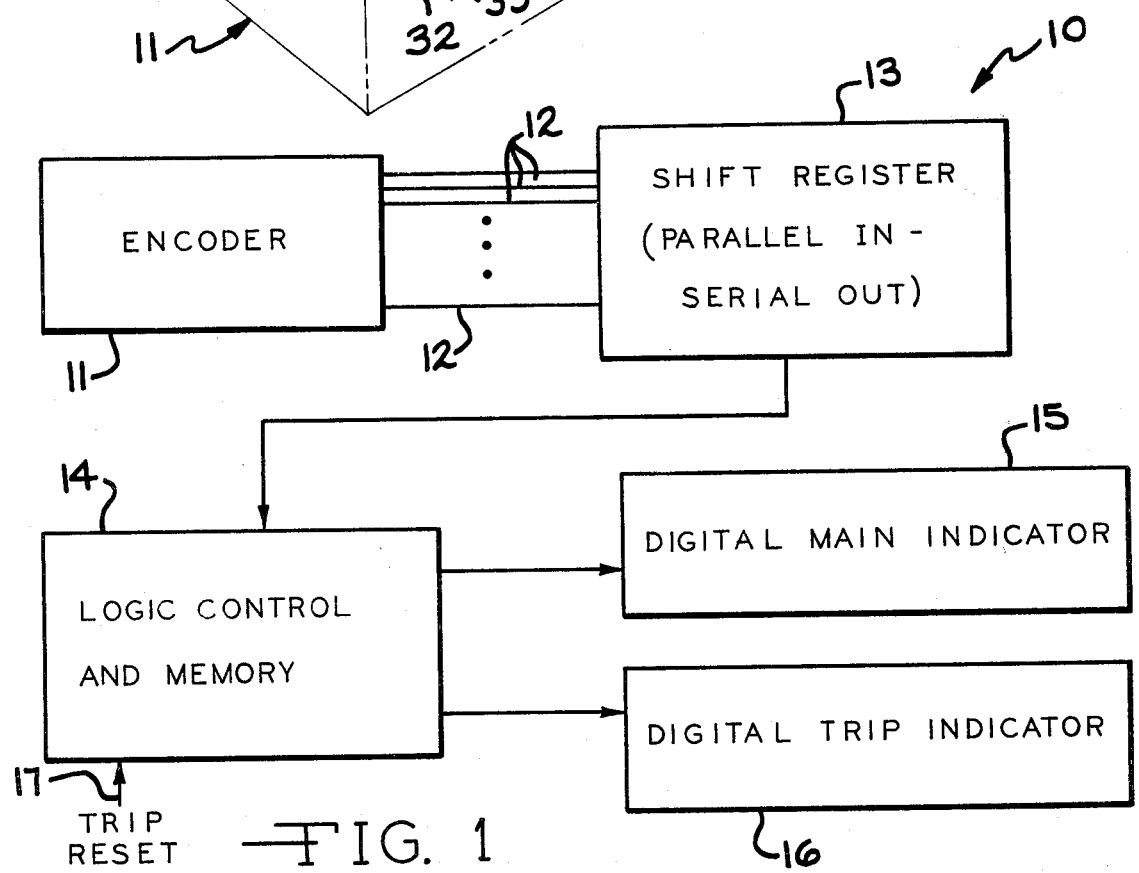

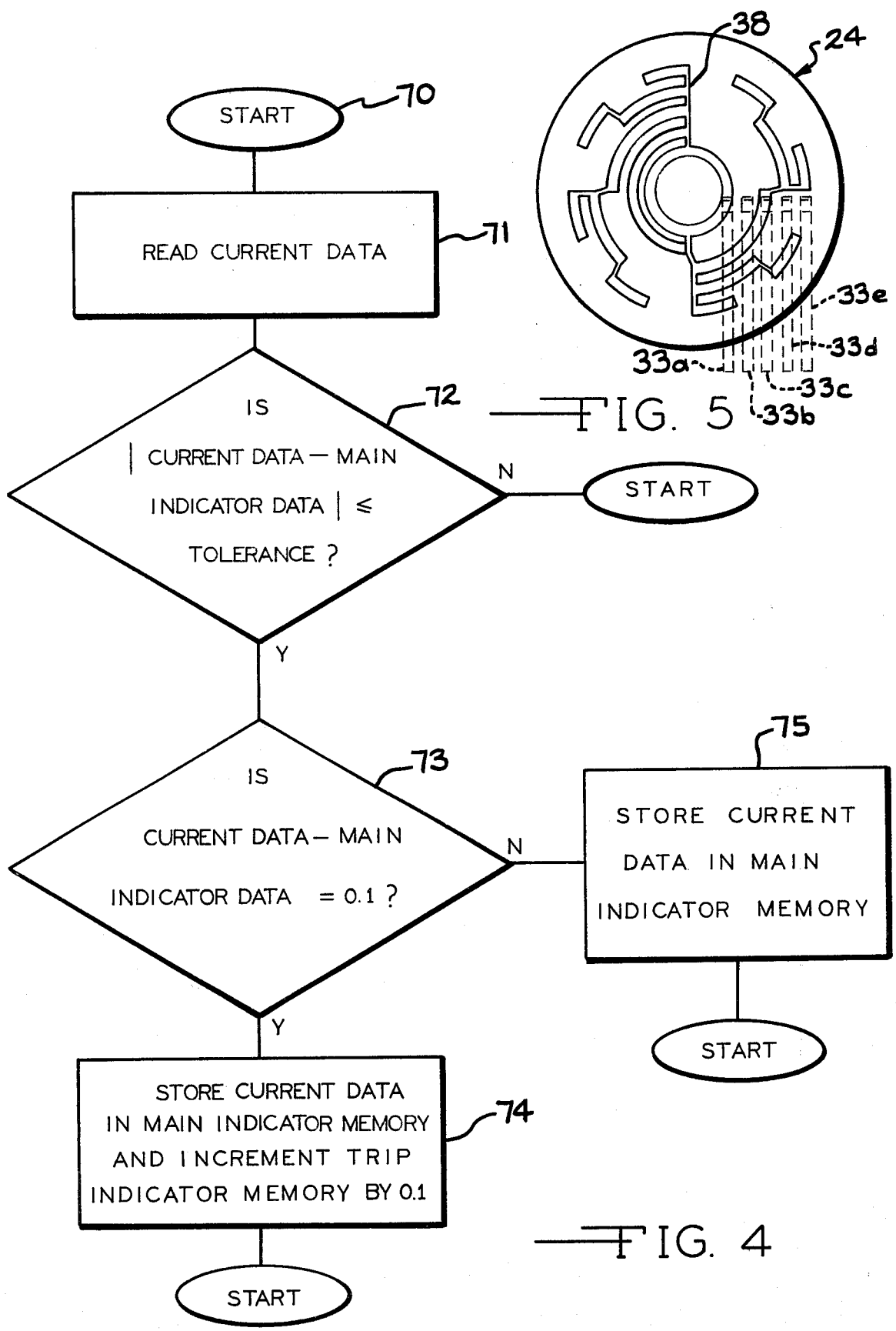

DIGITAL ODOMETER

BACKGROUND OF THE INVENTION

This invention relates to registers and more particularly to an improved digital odometer having an electronic display and a nondestructive memory.

As automobiles become smaller for economy, the available space for locating an odometer cable under the vehicle dash is restricted. The cost of the odometer cable and the difficulty in locating the cable under the vehicle dash add significantly to the cost of the vehicle. Furthermore, the odometer cable is failure prone, particularly where the cable must follow a tortuous path due to space limitations. The space limitations under the vehicle dash and the tortuous path make it extremely difficult for a mechanic to replace an odometer cable which has failed.

It is desirable to replace a strictly mechanical odometer normally found in vehicles with an electronic odometer to eliminate problems with the odometer cable. However, electronic odometers have not been adopted since in the past, electronic odometers have had a destructable memory. In other words, if the vehicle battery is disconnected or power otherwise is interrupted to the odometer, the accumulated distance count will be eliminated from the odometer's memory. The is not acceptable since laws in many jurisdictions require a permanent, nondestructive total mileage indication on all vehicles to prevent deception at the time the vehicles are sold.

SUMMARY OF THE INVENTION

The present invention is directed to an electromechanical digital odometer having a nondestructable memory. A mechanical memory unit is mounted directly on or near the vehicle transmission. The memory unit has a plurality of encoder wheels or discs, one for each digit of the measured distance, which are driven in synchronism with the vehicle transmission. An encoder disc for the least significant digit is incrementally rotated by a first, continuously rotated wheel or disc which generates clock pulses for driving the electronic portion of the odometer and provides a 10:1 speed reduction. The remaining encoder discs or wheels are incrementally rotated by a gear assembly in response to the continuously rotated least significant digit disc in a manner similar to that used for incrementally driving the number wheels in a mechanical odometer. The encoder discs are provided with patterns for generating digital signals indicating the position of the wheels. The signals are generated by any conventional manner, for example, by wiper contacts or by optical sensors. The digital data from the encoder wheels is shifted in parallel into a shift register and, subsequently, the data is clocked in a serial form to a logic control and memory which may be located at any convenient location, such as under the vehicle dash. The logic control compares the current data with data stored in a memory which drives a digital display mounted in the vehicle dash. If the change in the current data from the stored data is within a permissable tolerance, the current data is shifted into the memory to update the displayed distance. Also, if the current data deviates from the stored data for the main indicator by 0.1 miles or kilometers, then a memory for a trip indicator also is updated by 0.1 miles or kilometers. A switch is provided for manually resetting the trip odometer memory to 0.

The mechanical encoder wheels form a nondestructable memory. In the event that the vehicle battery is disconnected and subsequently reconnected, the main odometer indicator will return to the distance measurement set in the encoder wheels. Furthermore, the encoder wheels may be sealed to prevent tampering at the time the vehicle is sold. The electro-mechanical digital odometer also has the advantage that it eliminates the need for an odometer cable extending from the vehicle transmission to under the vehicle dash. By mounting the encoder directly on the transmission and by providing a serial output format, it is necessary only to run a minimum number of electrical wires from the encoder to the microprocessor and thence to the digital indicators on the dash.

Accordingly, it is an object of the invention to provide an electro-mechanical digital odometer that will provide an electronic display for vehicles.

Another object of the invention is to provide an odometer for vehicles which eliminates the need for an odometer cable extending from the vehicle transmission to the vehicle dash.

Other objects and advantages of the invention will become apparent from the following detailed description, with reference being made to the accompanying drawings.

BRIEF DESCRIPTION OF THE DRAWINGS

FIG. 1 is a schematic block diagram of an electromechanical digital odometer constructed in accordance with the present invention;

FIG. 2 is a fragmentary pictorial view of an encoder for use in the digital odometer of the present invention;

FIG. 4 is a logic diagram illustrating the operation of the microprocessor for driving the digital indicators; and FIG. 5 is a side elevational view of a hexidecimal encoding wheel for use in the encoder of FIG. 2.

DETAILED DESCRIPTION

Figure 3:
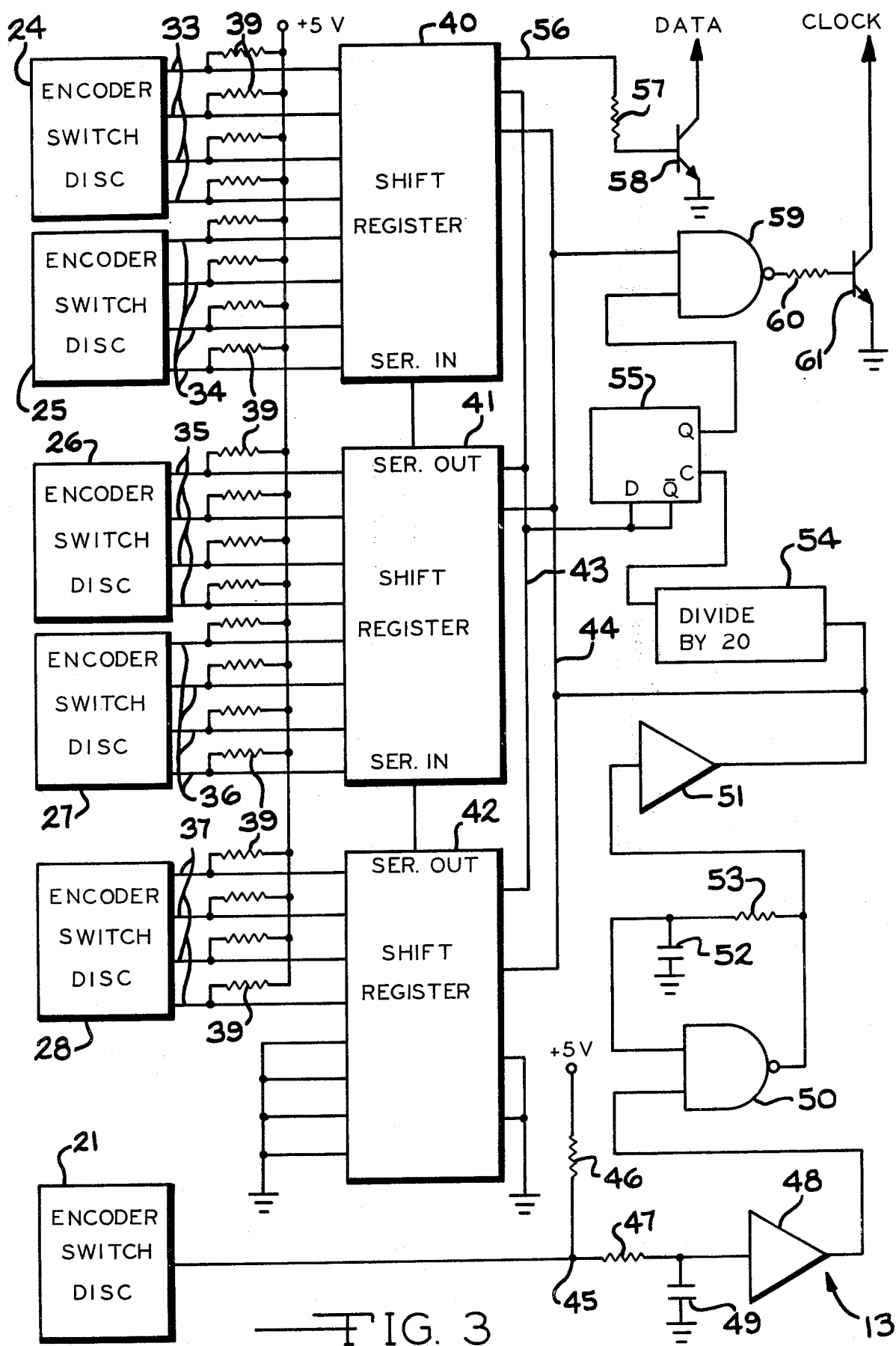
FIG. 3 is a detailed circuit diagram of the shift register circuitry for applying the parallel outputs from the encoder to the serial input of a microprocessor.

Turning now to the drawings and particularly to FIG. 1, a block diagram is illustrated for an electromechanical digital odometer 10 constructed in accordance with the present invention. The odometer 10 has a mechanical encoder 11 which may be mounted either directly on or near the vehicle transmission (not shown). The encoder 11 has mechanical elements which are positioned in accordance with the total accumulated mileage on the vehicle. The encoder 11 is designed to generate parallel outputs 22 representing in a digital format for the total accumulated distance driven by the vehicle. The outputs 12 are applied to parallel inputs of a shift register 13. The shift register 13 stores the data from the encoder 11 and periodically shifts the data in a serial format to a logic control and memory 14, which may be, for example, a microprocessor or a discrete logic circuit. The logic control and memory 14 may be located under the vehicle dash or at any other desired location within the vehicle and also may provide other control or monitoring functions in addition to measuring the distance driven by the vehicle. The logic control and memory 14 stores the measured distance in a memory or memory area which drives a digital main distance traveled indicator 15. In addition, the data is stored in a resettable memory or memory area within the logic control and memory 14 for driving a digital trip distance indicator 16. A manual input 17 to the logic control and memory 14 clears or resets to 0 the memory area which stores the trip distance for driving the trip indicator 16.

Turning now to FIG. 2, a fragmentary pictorial view is provided for an exemplary embodiment of the encoder 11. The encoder 11 has an input shaft 20 which is rotated by the vehicle drive train. The shaft 20 may, for example, mount a gear which engages another gear within the vehicle transmission when the encoder 11 is mounted directly on the vehicle transmission. Or, the encoder 11 may be located remote from the vehicle transmission and the shaft 20 may comprise a cable similar to a normal odometer cable. However, it is not necessary to mount the encoder 11 under the vehicle dash so that it is unnecessary to locate the shaft 20 or a cable functioning as the shaft 20 under the vehicle dash. The shaft 20 is connected to drive the encoder 11 either directly or through a gear reducer (not shown) and also through a one way clutch (not shown) which prevent backing up the count. A wheel 21 which is continuously driven is connected to intermittently drive a gear assembly 22 through teeth 23 mounted on the periphery of the disc 21. The wheel 21 provides a 10:1 reduction in the rotational speed of the shaft 20. Additional reduction may be provided, to obtain any desired scale factor. The gear assembly 22 in turn intermittently drives a plurality of encoder wheels or discs, of which five discs 24–28 are illustrated. The gear shaft assembly 22 and teeth on the periphery of the discs 24–28 intermittently drive the discs 24–28 so that the disc 24 advances by 1/16 revolution each time the disc 21 rotates one complete revolution, the disc 25 is rotated 1/16 revolution each time the disc 24 rotates through one revolution, etc. Gearing is provided between the shaft 20 and the vehicle drive train so that the disc 24 is rotated 1/16 of a revolution each time the vehicle travels 1/10 of a measuring unit such as 1/10 mile or 1/10 kilometer. Similarly, the disc 25 will rotate 1/16 of a revolution each time the vehicle travels 1.6 measuring units, the disc 26 will rotate 1/16 revolution each time the vehicle travels 25.6 measuring units, the disc 27 will rotate 1/16 revolution each time the vehicle travels 409.6 measuring units and the disc 28 will rotate 1/16 revolution each time the vehicle travels 6553.6 measuring units. The gear assembly 22 for incrementally advancing the wheels or discs 24–28 may be of any known type, such as is commonly used for driving the indicator wheels on a mechanical odometer.

The wheel 21 is provided with an electrically conductive surface area 30 over a portion of its surface, such as over a 270° segment of its surface. Two wiper contracts 31 and 32 are spring biased against the surface of the wheel 21 and are located so as to be electrically connected together by the surface area 30 except for the period of time that the gear teeth 23 move the gear assembly 22 to advance one or more of the discs 24–28. The signal formed by the electrical connection between the contracts 31 and 32 is used for generating a clock pulse for storing data in and reading data from the shift register 13 and also for inhibiting an output of data from the shift register 13 during the time that the discs 24–28 are advanced.

A plurality of wiper contacts 33 are positioned against a surface of encoder wheel 24 for contacting different swept areas on the surface of the wheel 24. A pattern for the face or surface of the wheel 24 is illustrated in FIG. 5. Five wiper contacts 33a–33e are illustrated in dashed lines as contacting five different areas on the wheel 24, each of which has a different radius. An electrically conductive foil pattern 38 is formed on the surface of the wheel 24 to selectively connect the four contact 33b–33e with the common contact 33a which may be either at ground potential or at a fixed voltage. The foil pattern 38 is arranged in 16 accurate segments so that as the wheel 24 is rotated through 360°, a four bit binary number is generated on the contacts 33a–33e. Contact 33e represents the least significant bit and contact 33b represents the most significant bit. By using a four bit or hexidecimal code on each of the five wheels 24–28 and incrementing each successive wheel by 1/16 revolution when the preceding wheel is rotated one full revolution, a 20-bit true binary number is generated. The 20-bit number corresponds to a maximum distance measurement of 104,857.6 miles or kilometers. Using a true decimal code, each wheel represents a single digit and 6 encoder wheels are required to store distances up to 99,999.9 miles or kilometers. Since fewer encoder wheels are required with a hexidecimal system, there is a cost savings with this system. Each of the swept areas is provided with a conductive pattern so that the contacts 33 generate true binary digital data indicating the position of the encoder disc 24 in 1/16 revolution movements. Similarly, contacts 34 engage a surface of the disc 25, contacts 35 engage a surface of the disc 26, contacts 36 engage a surface of the disc 27, and contacts 37 engage a surface of the disc 28 for generating true binary digital data corresponding to the positions of each of the discs 25–28 respectively. It will be appreciated from FIG. 2, that the positions of the discs 21 and 24–28 are established solely by the accumulated distance driven by the vehicle and will not change as a consequence of a power interruption in the vehicle, such as when the battery is disconnected. It also will be appreciated that the angular positions of the discs 21 and 24–28 may be measured by other known methods, such as by providing either reflective and nonreflective areas or transparent and opaque areas on each of the discs and sensing these areas through optical techniques rather than through the use of wiper contacts.

Turning now to FIG. 3, details are shown for the shift register circuitry 13 in the odometer 10. The shift register 13 includes three 8-bit parallel input, serial output shift registers 40–42. The shift registers 40–42 may, for example, comprise integrated circuits. The shift register 40 has four inputs each connected through a separate current limiting resistor 39 to a positive voltage source and also connected to four wiper contacts 33 for the encoder disc 24 and four inputs connected through resistors 39 to the voltage source and connected to the terminals 34 for the encoder disc 25. The shift register 41 has four inputs connected to the terminals 35 for the encoder disc 26 and four inputs connected to the terminals 36 on the encoder disc 27. The shift register 42 has four inputs connected to the terminals 37 on the encoder disc 28 and four inputs which are connected to ground, or, if an additional encoder disc is provided may be connected to receive data from such disc. Each active input to the registers 41 and 42 also is connected through a separate resistor 39 to the voltage source. A shift/load signal applied in parallel to the shift registers 40–42 on a bus 43 controls the loading of data into the shift registers 40–42 or the shifting data from the shift registers 40–42 in response to clock signals on a bus 44.

As previously indicated, distance data is shifted into and read from the shift registers 40–42 during a time interval immediately after the encoder discs 24–28 are advanced. The data shifting is accomplished in response to a signal generated by the continuously rotating encoder disc 21. The contacts 31 and 32 for the encoder disc 21 are connected to ground a junction 45 which is connected through a current limiting resistor 46 to a positive voltage source and through a resistor 47 to the input of an inverter 48. The input of the inverter 48 also is connected through a capacitor 49 to ground. The resistor 47 and capacitor 49 cause a time delay after the encoder switch disc 21 grounds the junction 45 before the output of the inverter 48 changes. It should be noted that when the junction 45 is disconnected from ground, the capacitor 49 will charge through the resistors 46 and 47 and the inverter 48 will have a grounded or zero logic level output. When the junction 45 is grounded, the capacitor 49 gradually discharges through the resistor 47 until the output from the inverter 48 changes to a positive logic level. The output of the inverter 48 is connected to one input of a NAND gate 50. The NAND gate 50 has an output connected to the input of an inverter 51. The other input of the NAND gate 50 is connected through a capacitor 52 to ground and through a resistor 53 to the output of the NAND gate 50. In operation, the input to the NAND gate 50 from the inverter 48 will normally be a low logic level so that the positive output from the gate 50 will charge the capacitor 52. When the encoder disc 21 generates a signal and after the time delay established by the resistor 47 and capacitor 49, the inverter 48 will apply a positive signal to the gate 50. The output from the gate 50 then will be at a grounded or low logic level, until the capacitor 52 discharges through the resistor 53. When the capacitor 52 discharges sufficiently, the output of the gate 50 will revert to a positive logic level until the capacitor 52 is again charged. Consequently, gate 50 will generate an output of periodic pulses which causes the inverter 51 to apply clock pulses to the bus 44.

Depending upon the logic level of the signal on the bus 43, data will be shifted into or read from the registers 40–42 in response to the clock pulses on the bus 44. It should be noted that 20 data bits are stored in the shift registers 40–42 from the five encoder discs 24–28 to form a 20-bit true binary number. Therefore, 20 clock pulses are required to serially shift this data to the logic control and memory 14. The clock pulses on the bus 44 are applied to a divider 54 which divides by 20. The output from the divider 20 clocks a flip flop 55. The bus 43 is connected to the $\overline{Q}$ output from the flip flop 55. When the flip flop 55 has a high logic level on the $\overline{Q}$ output, each clock pulse on the bus 44 causes data from the encoder discs 24–28 to be shifted into the shift registers 40–42. After 20 pulses, the divider 54 clocks the flip flop 55 to shift the $\overline{Q}$ output to a low logic level, thereby enabling the registers 40–42 to supply output data. The next 20 clock pulses on the bus 44 serially shift the data stored in the registers 40–42 through an output 56 and a resistor 57 to the base of a switching transistor 58. The transistor 58 has a grounded emitter and a collector connected to supply data to the logic control and memory 14. At the same time, the Q output from the flip flop 55 is applied to one input of a NAND gate 59 for enabling the gate 59 to pass clock pulses from the clock bus 44 through a resistor 60 to the base of a switching transistor 61. The transistor 61 has a grounded emitter and a collector connected for supply of clock pulses to the logic control and memory 14 for clocking the serial data into the logic control and memory 14. Thus, the shift register 13 operates in conjunction with the encoder discs 21 and 24–28 to receive data in parallel from such encoder discs and to serially shift this data along with clock pulses to the logic control and memory 14.

Turning now to FIG. 4, a logic diagram is shown for an exemplary program for the operation of the logic control and memory 14 on distance data received from the shift register 13. The microprocessor 14 is periodically cycled through a subroutine which begins at a start block 70. From the start block 70, current distance data received from the shift register 13 is read at a block 71. Then, at a block 72, the absolute value of the difference between the current data and the data being displayed by the main indicator 15 is compared with a tolerance range. If the difference is outside the tolerance range, it indicates that a false signal has been received from the encoder 11 and shift register 13. Consequently, the subroutine passes through the start block 70 and again reads data from the shift register 13. If the difference between the current data and the displayed data falls within the tolerance range, the subroutine again compares the difference between the current data and the displayed main indicator data at a block 73. If this difference is equal to 0.1 of the distance measuring units, such as 0.1 miles, the current data is stored in a main indicator memory and, also, a trip indicator memory is incremented by 0.1 at a block 74. The subroutine then recycles through the start block 70. If at the block 73 the difference between the current data and the main indicator data is not equal to 0.1 of a measuring unit, then the current data is stored only in the main indicator memory, as indicated by block 75 and the subroutine returns through the start block 70 to recycle. Consequently, the main indicator memory may be updated with the same number when there is no change in the measured distance, while the trip indicator memory will be updated only when there is a change in data of 0.1 of a distance measuring unit. It should be noted that data stored in the memories for the main indicator and for the trip indicator is updated only when a valid reading is received from the shift registers 13. If an attempt is made to read data from the shift register 13 when such data is not available, there will be no updating since the change between the current data and the main indicator data, as measured at the block 72, is not within the permissable tolerance.

It will be appreciated that various modifications and changes may be made in the above-described digital odometer. For example, the manner in which the position of the encoder discs 21 and 24–28 is determined may comprise any well known method, such as the illustrated wiper contacts or an optical method. Furthermore, it will be apparent that the manner in which the logic control and memory 14 processes and stores data received from the shift register 13 may be varied without departing from the invention. Various other modifications and changes also may be made without departing from the scope of the following claims.

We claim:
1. A digital odometer for a vehicle comprising mechanical encoder means located in the vicinity of and mechanically connected to be driven by the transmission of said vehicle, said encoder means including a plurality of rotatable encoder discs, means for incrementally rotating said discs by a predetermined amount for each unit of distance travelled by the vehicle, means for sensing and supplying digital electrical data signals corresponding to the rotational position of each of said discs as an indication of the total distance of travel of the vehicle, logic means including a first memory for receiving said data in digital form, and first digital indicator means for displaying data stored in said first memory, said indicator means being located for convenient viewing from the driver's area of the vehicle, said logic means and said first memory being wire connected to said transmission-located encoder, said logic means further including a second memory, manually controlled means for clearing said second memory, and program control means for incrementing the count stored in said second memory by a predetermined amount each time the contents of said first memory are incremented by such predetermined amount, and including second digital indicator means for displaying the count stored in said second memory.

2. The digital odometer of claim 1, wherein such digital data is supplied to said memory in a parallel format by a supplying means which comprises shift register means for receiving such data in a parallel format and for serially shifting such data to said logic means.

3. The digital odometer of claim 1, wherein said discs are arranged in sequence from least significant to most significant, wherein said rotating means includes means for rotating said least significant disc by 1/16 revolution increments and means for rotating each more significant disc by 1/16 revolution when the adjacent lower significant disc is rotated through one revolution, and wherein said generating means generates a parallel 4-bit true binary number from information on each disc as such disc is rotated through 360°.

4. The digital odometer of claims 3 or 1, wherein said logic means is a microprocessor.

* * * * *